Ｕnited States Patent [19]

Creager, Sr.

[11] Patent Number: 4,509,139
[45] Date of Patent: Apr. 2, 1985

[54] BINARY DATA STORAGE AND RETRIEVAL SYSTEM FOR SERIAL INTERFACE COMMUNICATIONS AND ARCHIVAL ACCESS

[75] Inventor: Robert L. Creager, Sr., Westerville, Ohio

[73] Assignee: Creager & Company, Westerville, Ohio

[21] Appl. No.: 341,230

[22] Filed: Jan. 21, 1982

[51] Int. Cl.³ .......................... G06F 3/00; G06F 5/04; G06F 13/00
[52] U.S. Cl. ...................................... 364/900; 360/32
[58] Field of Search ... 364/200 MS File, 900 MS File, 364/514, 518; 360/32, 39, 43, 48; 369/292, 99

[56] References Cited

U.S. PATENT DOCUMENTS

| 3,573,744 | 4/1971 | Rigazio | 364/200 |
| 3,685,031 | 8/1972 | Cook | 360/39 |
| 3,742,456 | 6/1973 | McFiggans et al. | 364/200 |
| 3,774,156 | 11/1973 | Marsalka et al. | 364/200 |
| 3,896,267 | 7/1975 | Sachs et al. | 340/748 |
| 4,003,083 | 1/1977 | Gariazzo | 360/39 |
| 4,108,361 | 8/1978 | Krause | 364/412 |
| 4,238,834 | 12/1980 | Yates | 364/900 |
| 4,270,174 | 5/1981 | Karlin et al. | 364/424 |
| 4,389,546 | 6/1983 | Glisson et al. | 179/18 B |
| 4,398,225 | 8/1983 | Cornaey et al. | 360/39 |

OTHER PUBLICATIONS

Lancaster, D. CMOS Cookbook, 1978, pp. 63, 65, 74, 79, 104, 105, 109, 126 and 391.
Intersil, Inc., Data Book, 1981, pp. 6, 75 and 8-144 to 8-151.

Primary Examiner—James D. Thomas
Assistant Examiner—William G. Niessen
Attorney, Agent, or Firm—Porter, Wright, Morris & Arthur

[57] ABSTRACT

An apparatus including recording and playback means for providing a "real time" record of an RS-232C data signal transmitted to a terminal by a host computer. Signal processing means including a universal asynchronous receiver transmitter is included in the preferred embodiment and a cassette recorder means is used as a storage means for the data signal. The recording means is "transparent" to the computer and terminal and allows discretionary playback of recorded data. The playback mode of the apparatus is suitable for use as an archival access or index system and may also be a means for text publication.

15 Claims, 12 Drawing Figures

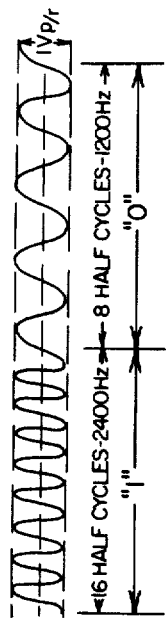
FIG. 1D
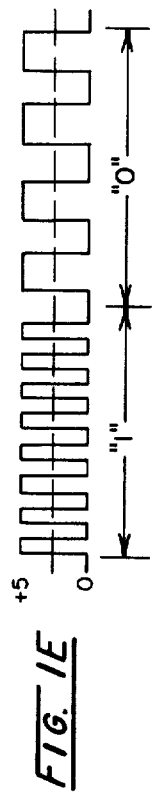
FIG. 1E
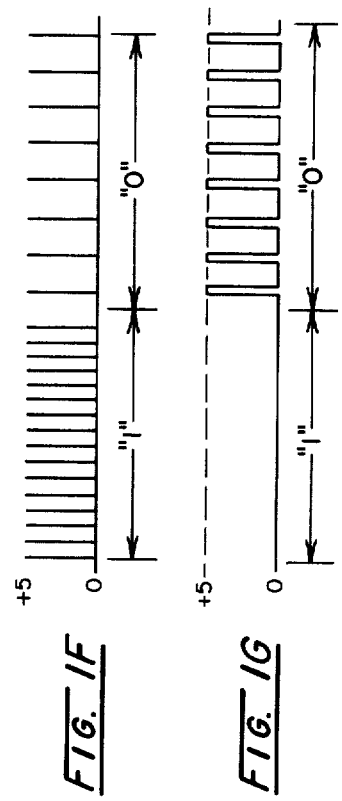
FIG. 1F    FIG. 1G
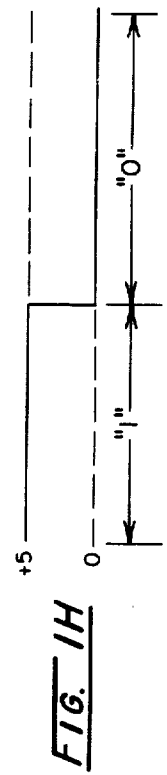
FIG. 1H
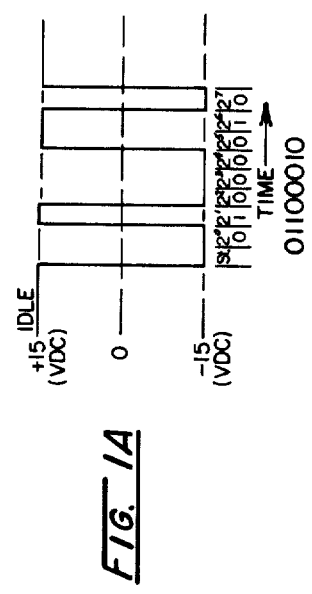
FIG. 1A
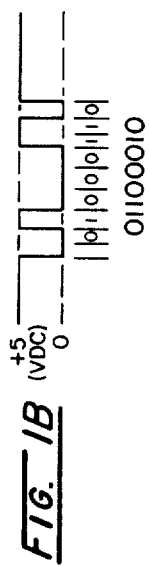
FIG. 1B
FIG. 1C
FIG. 1

BINARY DATA STORAGE AND RETRIEVAL SYSTEM FOR SERIAL INTERFACE COMMUNICATIONS AND ARCHIVAL ACCESS

FIELD OF THE INVENTION

This invention relates to apparatus and signal processing means for the recording, storage and retrieval of binary information which, in general, is transmitted between computer(s) and terminal(s), and particularly that type of binary information which is accessed by terminal means from a master data base.

THE PRIOR ART

The prior art includes various means for accessing the data storage base of one computer, at a distance, by interconnecting a terminal means of a second computer processor to the data storage base of the master computer. Typically, the interconnection between a master computer, having the data base, and the distant terminal is accomplished by wire connection or telephone line modem and inter-computer communication is accomplished by data transmission according to various industry standardized systems. Thus, for example, in the case of "home" computers and terminals which have recently become popular in the market, the serial interface standard known as "RS-232C" has become the industry accepted definition for signal parameters relevant to data communication. The RS-232C standard is published by the Electronic Industries Association, Washington, D.C. and defines the interface between data terminal equipment and data communications equipment employing serial binary data interchange.

In this regard, there have also been developed large computer data bases generically known as video-text systems which are accessible to a user over a telephone connection. Such data bases include "Compuserve", Columbus, Ohio, "The Source", Arlington, Va.; and other data bases such as "Lexis", Mead Data Services, Dayton, Ohio, have been developed to serve specialized needs of particular professions. Similarly, electronic publishing and home computer terminal banking are just beginning to become endeavors of commercial interest.

The state of the prior art is that cathode ray tube "terminal" systems are typically used as the visual medium for information access to a master data base; the visual terminal operates in real time as information is displayed on the CRT screen. If data is desired to be stored, printer means or other complicated and expensive data storage means is required to produce a copy representative of the video display. "Hard copy" terminals including a typewriter like printer means are also available to provide on paper a printed copy of the data accessed; however, printer terminals are expensive and difficult to maintain. Certain printers may also use paper, such as thermal or other coated paper, which is not suitable in quality, either in print format or in material, to lend itself to archival preservation.

In the absence of storage capability, with respect to a cathode ray tube video terminal system, the evaluation of the data accessed for extended periods of time may become economically prohibitive because the access charge to the master computer is paid for on a per unit of time basis. For example, if a text segment displayed on a CRT video terminal were desired to be carefully studied or thoroughly examined, the cost per time unit incident to a careful study of the text as displayed on a terminal CRT, would greatly exceed the first time access and display charge.

Thus, there exists in the art a need to provide a reliable, low cost, error free medium and apparatus which may be used in conjunction with computer terminal devices which may be used to store data which is accessed, or to develop a library or record of data base information, which initially was derived from a computer data base system.

OBJECTS OF THE INVENTION

It is an object of the invention to provide a means of data storage for computer terminal inter-communication which is inexpensive and reliable and which provides a repeatable copy of data initially accessed. It is a further object to provide such means which:

(1) Records, at a remote location, computer network data accessed from a phone line connection simultaneously while data is displayed at a terminal at the remote location;

(2) Allows the recorded data to be played back any time, "off line"; and includes a playback function which may be stopped, started, advanced, rewound, or repeated at any time during the period of data playback.

(3) Allows the data display to remain on a display screen while recording means is stopped;

(4) Uses an interchangeable inexpensive audio cassette recorder and magnetic cassette tape as the recording and data storage media. Thus, data may be recorded on one cassette recorder and played back on another; and (5) Plays data back in real time exactly as the data was recorded when first accessed by the remote terminal.

The further object of the invention is to provide data recording means: which is compatible with any micro computer or terminal having an RS-232C serial port; which works with any direct connect or accoustical telephone modem with an RS-232C serial port; and which is "invisible" both to host and terminal computers with respect to their interconnection.

And yet a further object is to provide a completely electronic device, without accoustical or mechanical connections, which itself has only three necessary connections: (1) modem, (2) recorder, and (3) power source, and only two access controls for "on-off" and "record/playback".

Additional objects achieved as options in conjunction with the basic apparatus of the invention include capability to send data back to a host computer and to play back at baud rates which differ from that of the "original" transmission or recording. Specifically, the baud rate of playback can be increased from the baud rate of the recording; and conversely, with suitable means provided the baud rate of playback may also be reduced from that of the recording.

Thus, the invention described herein records data simultaneously while that data is viewed on a CRT terminal and records independently of the CRT display; allows playback off line at anytime; uses a standard audio casette magnetic tape and recorder; works through any phone modem and works with any micro computer or terminal with RS-232C logic. It is an all electronic means without accoustical connection and is "transparent" to sending and receiving computers.

The invention is thus useful in connection with any micro computer or terminal which uses a RS-232C serial interface, or such other interface or may be appropriate for a particular system, and a data base information network. The invention is also useful to make phono-records of data and to "translate" baud rates recorded to any other or different baud rate desired when the recorded data is played back. While in the preferred embodiment of the invention, a standard audio cassette tape and recorder (⅛" tape at 1⅞ inches per second) is utilized as the storage medium, principally for economic reasons, the invention is also adaptable for use with other storage means such as floppy disc, hard disc, or in-line random access memory of a sufficiently large capacity.

Further, the apparatus of the invention is readily adaptable to be sold as a unit, as a separate system "add-on", or incorporated in a modem or the terminal itself as an integral circuit element. Similarly, the "playback" segment of the circuit lends itself to application in archival record systems whereby a data base can be accessed by forwarding, stopping, and/or rewinding much in the same manner as a present microfiche system.

DESCRIPTION OF THE DRAWINGS

The invention is explained hereafter in conjunction with the drawings in which:

FIG. 1, having sequential depictions, 1A through 1H, shows the steps in which a binary signal is processed in accord with the apparatus of the invention when the data to be stored is recorded as sine wave information on an audio cassette magnetic tape.

DESCRIPTION OF THE PREFERRED EMBODIMENT

Figure 2:
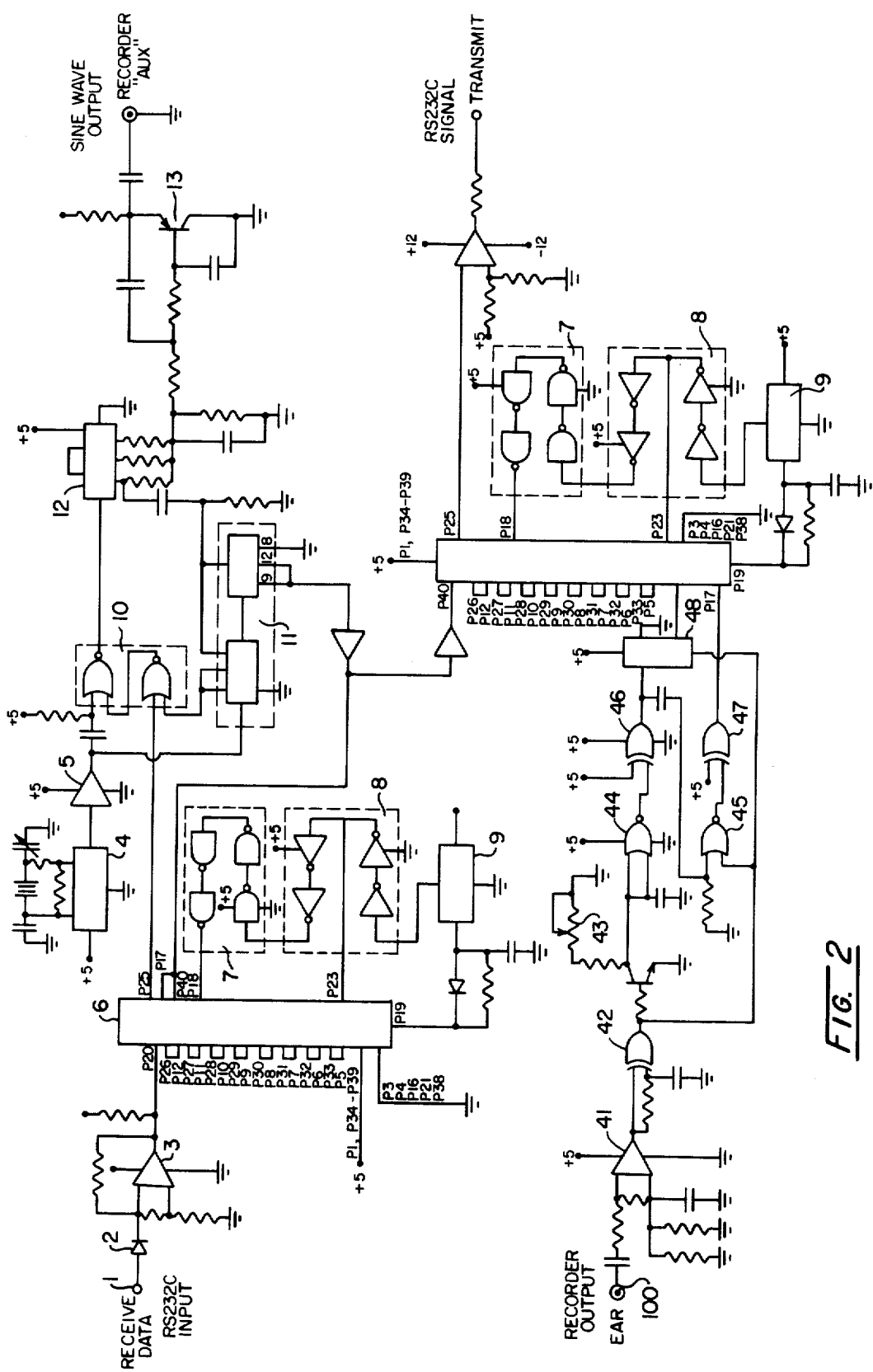
FIG. 2 shows the preferred embodiment circuit diagram of the overall system for a record/playback apparatus using a standard audio cassette and recorder.

With reference to the signals depicted in FIG. 1 showing the manner in which binary data signals are processed in accord with the means of the invention, FIG. 1A shows an RS-232C character data signal byte, which has a amplitude of plus/minus 15 volts and includes parity, stop, and start bits associated with the binary data character in the signal. Typically, the RS-232C data signal includes the parity, stop, and start bits, known as control bits, in conjunction with each data character in the signal. The overall signal includes such data signal serially transmitted in real time in accord with a predetermined baud rate. The specific nature of the RS-232C signal is an industry standard known in the prior art. In the apparatus of the invention, such a signal is received by the remote terminal through a modem connection by telephone line to the host computer. In the signal processing accomplished by the apparatus of the invention, the RS-232C signal is reduced to logic level, which normally is 0 to +5 volts, as shown in FIG. 1B, to permit the processing circuit to handle the signal for further processing. Next, in accordance with the preferred embodient the signal is stripped of all control bits, leaving only the character data bits; a signal such as is shown in FIG. 1C is thus provided for each character received in a serial transmission of the characters incident to the information of the signal.

Thus, in the signal processing method of the invention, means are first provided to adapt a serial data signal in amplitude to a logic amplitude level. Next, the bits incident to the data signal, which are not information character bits, are stripped from the input serial data signal by further processing means to provide a uniform, repeatable, character bit signal in which information characters, only, sequentially follow one another in a string fashion. Each character constitutes a uniform, same number of bits, in a character information string which corresponds in real time to the time sequence in which the information is received from the host computer. This "string" of character bits, is next translated into a recordable sine wave signal which is recorded by cassette recorder means, also in a real time correspondence. In the preferred apparatus, this sine wave signal is generated by the use of known signal processing means utilizing a "bit-boffer". Typical "bit boffer" circuitry appropriate for use in conjunction with the preferred embodiment of the apparatus is described at page 391, *CMOS Cookbook*, Lancaster, D., Howard Sams, Publisher 1978.

Thus, as processed in the bit boffer, as shown in FIG. 1D, the binary signal 1's and 0's are converted into frequencies, and the frequency signal is recorded on magnetic tape for future playback.

Thus, as described herein, there is provided, in general, an apparatus for recording at a remote location a data signal transmitted from a host computer. In processing a data signal which consists of a succession of serial binary digital signals which comprise a character byte which includes a predetermined number of control bits associated with each data character, which has a uniform predetermined number of bits, the apparatus generally includes a receiver means for receiving at the remote location a binary signal generated by the host computer and signal processing means for processing said received signal to provide a serial succession of recordable (or memorable) character data signals of a uniform bit length.

In the preferred embodiment, a first means for receiving a serial input signal and converting said serial signal into a parallel data signal is provided. In this means, register means for providing a pulse at the beginning of each character to set a buffer means to store a number of bits corresponding to the uniform number of bits associated with each data character and a buffer means to store said data character bits are included. A transmitter means for providing a parallel data signal from said buffer means when a number of bits corresponding to the number of bits in a data character are stored is also included. A second means for receiving the parallel data signal from said buffer means and translating said parallel data signal into a serial data signal which comprises only the bits of the character which are associated with the data information of the character is also utilized in the preferred embodiment. The serial character data signals comprising only a string of characters are then stored in memory means in a sequence corresponding to the succession of data signals transmitted from the host computer in a "real time" correspondence with the host computer transmission.

To "playback" a signal so processed and recorded in connection with the invention, the sine wave signal which comes off the recorded tape is converted back to binary 1's and 0's, and parity, start, stop bits are reinserted in the sequential character string to recreate in real time the actual signal as it was originally received, as is shown in the sequence of FIGS. 1D through 1H.

The preferred apparatus of the invention which conducts the foregoing sequential signal processing, is explained by reference to the circuit diagram of FIG. 2, showing the system outline utilized in conjunction with the preferred apparatus.

In more particular detail, the specific means employed in "record" function is described below. The reverse operation is "playback" mode will be evident to those skilled in the art.

With reference to FIG. 2, the binary data signal from the host computer including the parity, stop and start control bits associated with each information character transmitted in the signal, as represented in FIG. 1A, is received from the host computer through an RS-232C interface at point 1 and passes through diode 2. At this point, the signal may be referred to as the "original" baud rate signal. The signal is adjusted in amplitude to a signal level appropriate for further processing, by operational amplifier, 3 such as a commercially available unit LM 339. (As referred to in this Specification, the preferred circuit elements, except as otherwise stated, are more particularly described in the aforementioned *CMOS Cookbook*, Lancaster, D. Howard Sams, Publisher, 1978.)

A system clock or timing means conventional with digital signal data processing apparatus is also utilized in the preferred embodiment. Such a system clock, which is the baud rate generator, including a crystal controlled oscillator and resistive capacitative network is associated with the 14 stage (÷16,384) binary ripple counter with internal oscillator 4, such as a 4060 unit, used in the preferred embodiment. *CMOS Cookbook* at page 109. The oscillator signal is further processed and introduced into the circuit through buffer and driver means, 5, such as a 4050 unit used in the preferred embodiment. (*CMOS Cookbook* at page 105).

Figure 3:
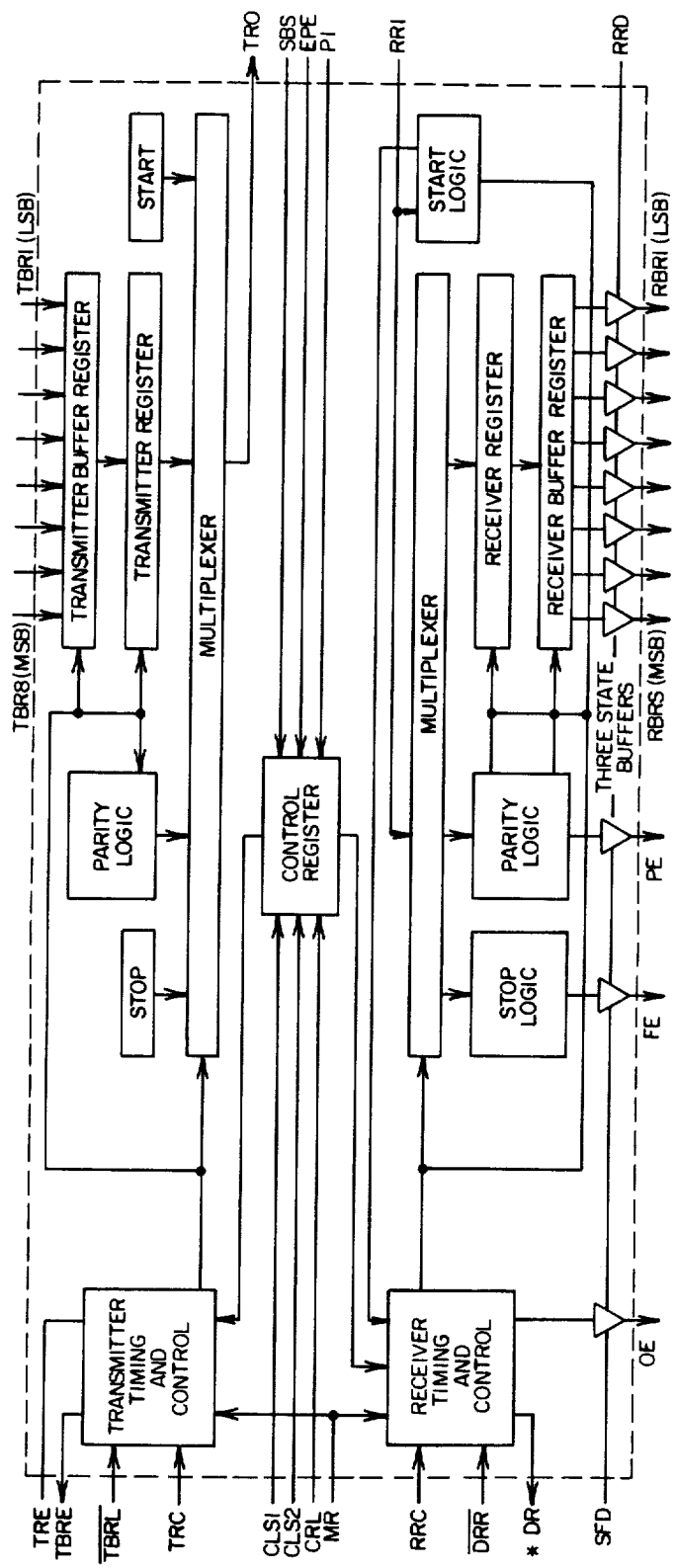
FIG. 3 is a functional block diagram which shows with greater particularity the relationship of circuit elements used in conjunction with the signal processing means of the record and playback function in the apparatus.
Figure 4:
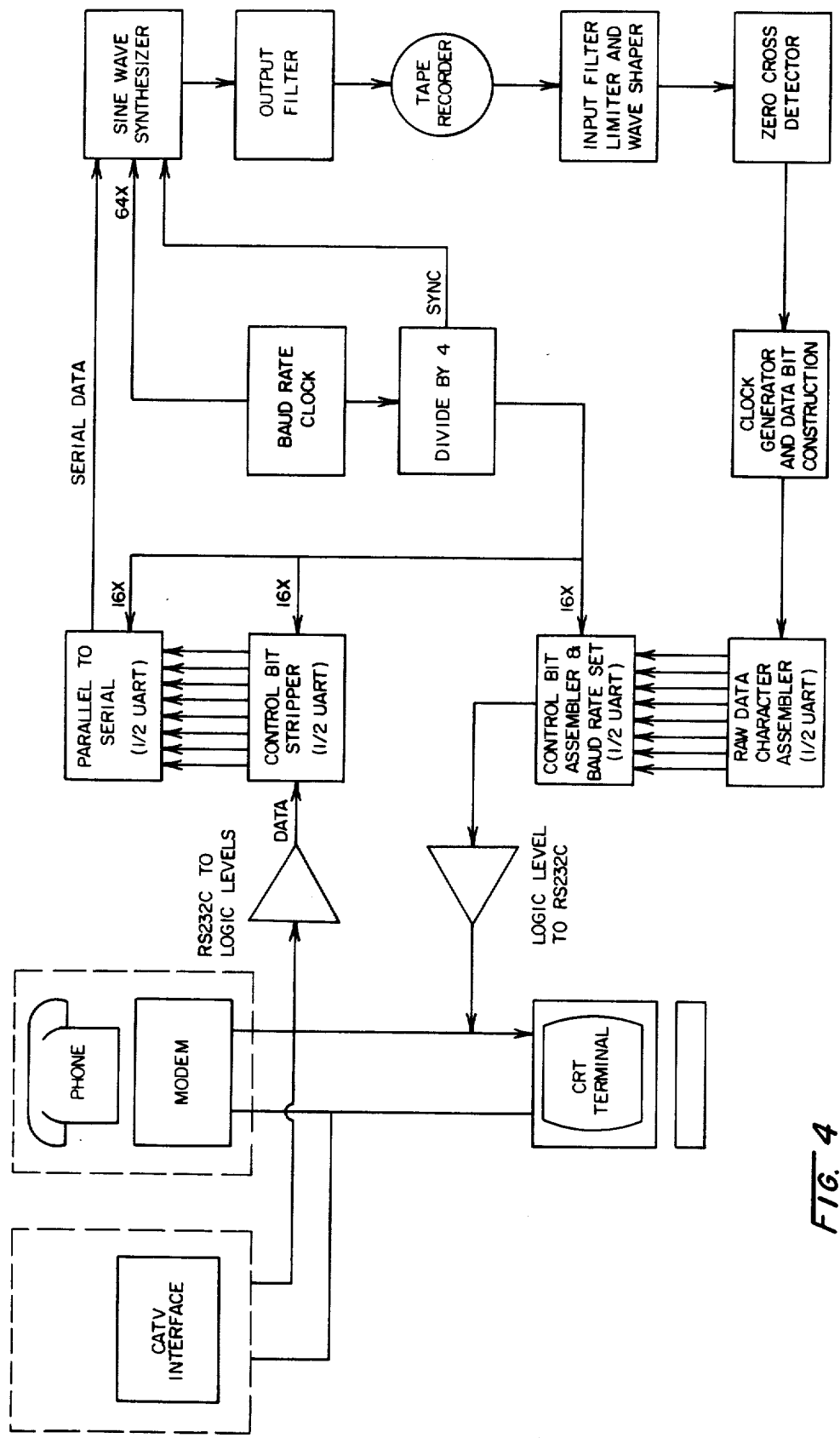
FIG. 4 is a functional block diagram showing the overall relationship of circuit functions in the apparatus.
Figure 5:
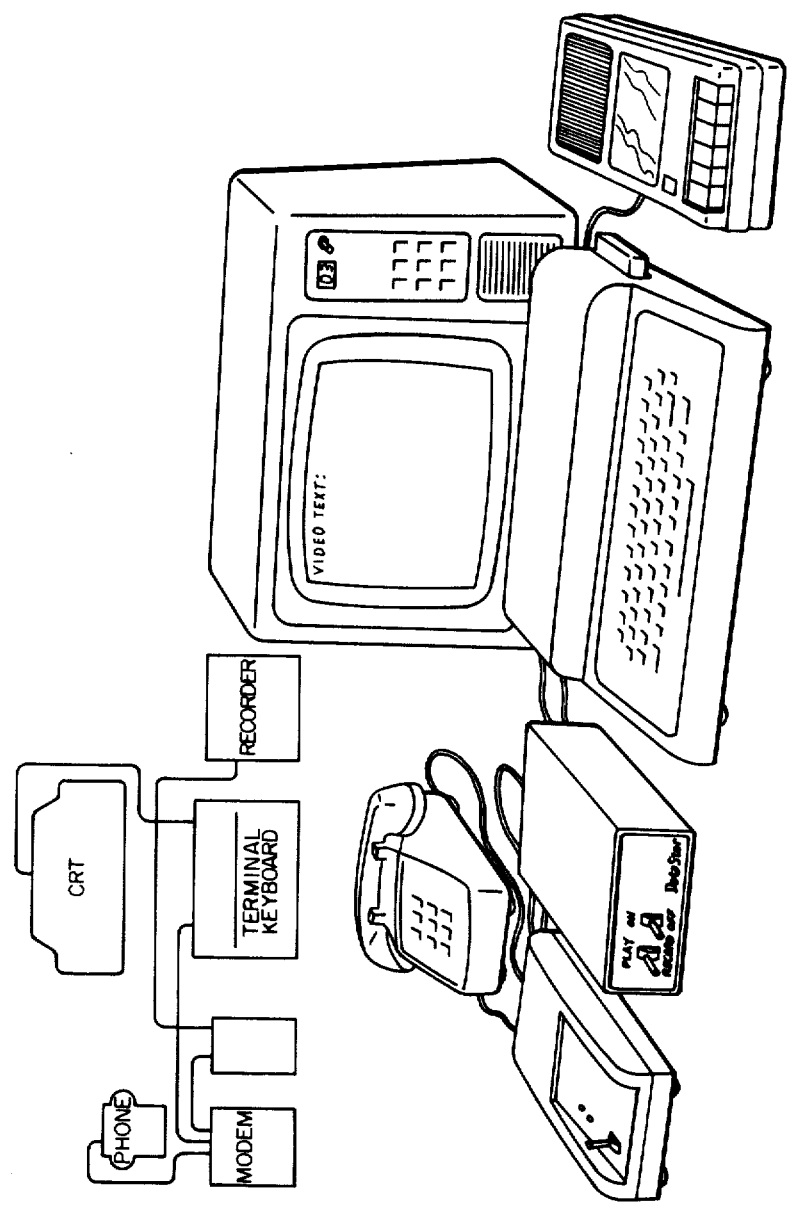
FIG. 5 shows an operating system of the invention.

The signal is then input into a "UART," Universal Asynchronous Receiver Transmitter, 6. A preferred UART is model IM6402, manufactured by Intersil Inc., 10710 North Tantau Avenue, Cupertino, Calif. 95014. The UART, as utilized in the apparatus herein, is a "two sided" device which, on one input "side" receives a serial data signal and out puts a parallel data signal; on the other "side," the UART is capable of receiving a parallel data signal and providing a serial data signal at the output. Intermediate the two "sides", the UART is capable of other signal processing functions including timing and control, logic and multiplexing. More particularly, the operation of UART, 6, is described in *Data Book*, 1981, copyright 1981, published by Intersil, Inc. at the above stated address. A functional pin definition of the UART of the preferred embodiment is described therein, at pages 8-144 et seq. With respect to the functional block diagram of the UART shown in FIG. 3, the pin number/functional description of the commercially available UART employed in the preferred embodiment is set forth below:

| Pin | Symbol | Description |
|---|---|---|
| P1 | Vcc | Positive Power Supply |
| P2 | | No Connection |
| P3 | GND | Ground |
| P4 | RRD | A high level on RECEIVER REGISTER DISABLE forces the receiver holding register outputs RBR1-RBR8 to a high impedance state |
| P5 | RBR8 | The contents of the RECEIVER BUFFER REGISTER appear on these three-state outputs. Word formats less than 8 characters are right justified to RBR1. |
| P6-P12 | RBR7 | See Pin 5 - RBR8 |
| P13 | PE | A high level on PARITY ERROR indicates that the received parity does not match parity programmed by control bits. The output is active until parity matches on a succeeding character. When parity is inhibited, this output is low. |
| P14 | FE | A high level on FRAMING ERROR indicates the first stop bit was invalid. FE will stay active until the next valid character's stop bit is received. |
| P15 | OE | A high level on OVERRUN ERROR indicates the data received flag was not cleared before the last character was transferred to the receiver buffer register. The Error is reset at the next character's stop bit if $\overline{DRR}$ has been performed (i.e., $\overline{DRR}$: active low) |
| P16 | SFD | A high level on STATUS FLAGS DISABLE forces the outputs PE, FE, OE, DR, TBRE to a high impedance state. |
| P17 | RRC | The RECEIVER REGISTER CLOCK is 16× the receiver data rate. |
| P18 | $\overline{DRR}$ | A low level on DATA RECEIVE RESET clears the data received output (DR), to a low level. |
| P19 | DR | A high level on DATA RECEIVED indicates a character has been received and transferred to the receiver buffer register. |
| P20 | RRI | Serial data on RECEIVER REGISTER INPUT is clocked into the receiver register. |
| P21 | MR | A high level on MASTER RESET (MR) clears PE, FE, OE, DR, TRE and sets TBRE, TRO high. Less than 18 clocks after MR goes low, TRE returns high MR does not clear the receiver buffer register, and is required after power-up |
| P22 | TBRE | A high level on TRANSMITTER BUFFER REGISTER EMPTY indicates the transmitter buffer register has transferred its data to the transmitter register and is ready for new data. |
| P23 | $\overline{TBRL}$ | A low level on TRANSMITTER BUFFER REGISTER LOAD transfers data from inputs TBR1-TBR8 into the transmitter buffer register. A low to high transition on $\overline{TBRL}$ requests data transfer to the transmitter register. If the transmitter register is busy, transfer is automatically delayed so that the two characters are transmitted end to end. |
| P24 | TRE | A high level on TRANSMITTER REGISTER EMPTY indicates completed transmission of a character including stop bits. |
| P25 | TRO | Character data, start data and stop bits appear serially at the TRANSMITTER REGISTER OUTPUT. |
| P26 | TBR1 | Character data is loaded into the TRANSMITTER BUFFER REGISTER via inputs TBR1-TBR8. For character formats less than 8-bits, the TBR8, 7, and 6 inputs are ignored |

-continued

| Pin | Symbol | Description |
|-----|--------|-------------|
| | | corresponding to the programmed word length. |
| P27-P33 | TBR2 | See Pin 26 - TBR1 |
| P34 | CRL | A high level on CONTROL REGISTER LOAD loads the control register. |
| P35 | PI | A high level on PARITY INHIBIT inhibits parity generation, parity checking and forces PE output low. |
| P36 | SBS | A high level on STOP BIT SELECT selects 1.5 stop bits for a 5 character format and 2 stop bits for other lengths. |
| P37 | CLS2 | These inputs program the CHARACTER LENGTH SELECTED (CLS1 low CLS2 low 5-bits) (CLS 1 high CLS2 low 6-bits) (CLS1 low CLS2 high 7-bits) (CLS1 high CLS2 high 8-bits) |
| P38 | CLS1 | See Pin 37-CLS2 |
| P39 | EPE | When PI is low, a high level on EVEN PARITY ENABLE generates and checks even parity. A low level selects odd parity. |
| P40 | TRC | The TRANSMITTER REGISTER CLOCK is 16× the transmit data rate. |

Employing the preferred UART in the apparatus of the invention, a serial signal adapted to signal processing amplitude levels, is input at pin P20 in the receiver register input (RRI) and is clocked into the receiver register. At pin P19 data received (DR), the receipt of the serial signal is verified and a high level signal is created to indicate that a character has in fact been received and transferred to the UART receiver buffer register. This verification signal is converted to a pulse signal by buffer and driver means shown at 9 (such as unit 4049, *CMOS Cookbook* at page 104); the pulse in turn is subject to delay in network gates 7 and 8. In the preferred embodiment, the network gates are sequential positive logic NAND gates, such as a commercially available unit 4093 shown at 7, each of which provides a propogation delay of 300 nanoseconds at 5 volts, and gates 15-18 are sequential NOR gates, each of which provides a propogation delay of 60 nanoseconds at 5 volts, such as commercially available unit 4011 shown at 8, See *CMOS Cookbook* at pages 126 and 73.

The delayed pulse, in turn, is input to pin P18 of UART to provide a data received reset (DRR) signal, which resets the buffer and counter to await receipt of the next character.

The signal generated between the paired NAND gates, 8, is input to pin P23 of UART which is the transmitter buffer register load (TBRL). A low to high transition on this pin requests data transfer to the transmitter register. If the transmitter register is busy, transfer is delayed, and two characters comprising only the character information bits incident to the signal are transmitted end to end as serial data from pin P25 of the UART.

In this regard, the UART is programmed to receive a specific number of bits (typically 8 for the RS-232C standard signal) per character. In the apparatus herein, the parallel output pins of UART, P5 through P12 on which appear the contents of the receiver buffer register are respectively connected to parallel input pins P33 through P26 which in turn provides a serial output of successive eight bit characters which are next processed for recording. In this manner, the UART "strips" the RS-232C signal of the start, stop and parity bits, and at transmitter register output (TRO) data out pin P25 provides a string of successive eight bit characters. The "bit boffer" circuit, includes NOR gates such as unit 4001 (*CMOS Cookbook* at page 65) shown at 10, which provide propagation delay of 60 nanoseconds at 5 volts, flip-flop binary divider means, such as a 4013 unit (*CMOS Cookbook* at page 74) shown at 11, and a walking ring synchronous counter, such as a 4018 unit (*CMOS Cookbook* at page 79) shown at 12, to generate either a 1200 or 2400 hertz signal, which is output as a one volt peak-to-peak sine wave through transistor driver such as a 2N6003 shown at 13, to a cassette recorder input. Feedback is provided from the sine wave synthesizer to the divider network so that the sinewave signal automatically switches before a zero crossing of the digital signal, each time the serial data changes from "1" to "0" or back again. Hence, the character string is translated to recordable sine waves in accord with a sequential data bit correlation.

The resistance and capacitance values incident to the circuit are determined in accord with the skill of the art depending upon the choice of the principal signal processing units employed.

If control bits were present in the signal recorded, the 8 bit correlation in the bit boffer would include the control bits in the sequence and the recorded signal would not at all relate with the data received. If such a signal were recorded, when playback was attempted, random "junk" devoid of information would appear as the screen display. The apparatus not only allows accurate recording and reliable playback of the character information received but also provides advantageous utilization of the memory storage media since start, stop and parity bits need not be stored with the character data information signal. This is particularly important as an in-line random access memory is utilized as the storage media. Given a fixed memory capacity, information storage capability is increased by the number of bits "stripped" which need not be stored for functioning of the apparatus of the invention.

In "playback" operation a tape recorded sine wave signal corresponding to binary 1's and 0's, such as shown in FIG. 1D, is input at 100 to driver means, 41, such as a commercially available 3130 unit (*CMOS Cookbook* at page 63). The sine wave signals from the audio tape cassette are converted to square wave form corresponding to the signal shown in FIG. 1E. In this connection, filter and limiter are provided to minimize the effect of hum and bias variations and provide a square wave having zero crossings which correspond to the recorded sine wave. The leading edge and the trailing edges of the square wave are converted to narrow positive pulses with an exclusive OR circuit and a stream of narrow pulses, one pulse occurring at each zero crossing.

The transistor, capacitor, and baud rate control, form a retriggerable monostable oscillator which is adjusted so that the signal is positive $\frac{3}{4}$ of the way through a low-frequency half cycle. Thus, a string of eight pulses for a "0" and no pulses for a "1" are provided. The final flip-flop recovers the binary "1"-"0" data, and the leading edge of the waveform is shortened and combined with clock pulses to provide a composite UART clock output. Thus, the UART receiver gets sixteen clock pulses for a "1" and sixteen clock pulses for a "0". In the case of a "1", all pulses come from the tape signal. While for a "0", half of the pulses come from the tape and the other half from the monostable oscillator. Although the spacing between these will change slightly as speed of the recorder varies, these have no effect on the UART's operation, hence, speed tolerance is achieved. With reference to FIG. 2, the sine wave signal of the tape recording is processed in steps through the sequence of different wave shapes shown in FIGS. 1D through 1H.

More particularily, the playback exclusive OR gate, 42, such as 4070 unit (*CMOS Cookbook* at page 109), produces a pulse at the zero crossing points of the sine wave, to produce the wave form such as shown in FIG. 1F. This provides the appropriate timing signal at playback.

Variable baud rate control, 43, is provided as a waveshaping means to control the pulse width as shown in FIG. 1G. NOR gates 44 and 45, (a 4001 unit, supra) and exclusive OR gates 46 and 47 (a 4070 unit, supra) in conjunction with flip-flop, 48 (a 4013 unit, supra) produce binary 1 and 0 signals in a timed sequence, and this signal corresponding to FIG. 1H, is thereupon input to the receive side of the UART at playback. In the preferred apparatus using an IM6402 UART, this signal is input at pin P20, and is output after processing at pin P25 in accord with the same manner explained above with respect to the "record" mode. In this manner, the start, stop and parity bits are reinserted by the UART within the character data serial signal; and the original RS-232C signal is recreated and output through driver means when the recorded signal is played back.

Switching means for selecting between "record" and "playback" made of the apparatus maybe conveniently provided.

Other means to accomplish the signal processing of the invention may be evident to those skilled in the art. It is evident that the data storage medium of the apparatus may be any other suitable device such as a hard disc, floppy disc, optical storage media, or in-line random access memory. As to the later, a 256K chip will provide 24 minutes of real time "memory" of a signal of 1200 baud. Appropriate resistance, capacitors and operating voltage levels will be evident depending upon the selection of operating circuit elements.

The utility of the apparatus may be appreciated with respect to the following examples:

EXAMPLE I

A lawyer in a small law office requires access to a large law library. The cost of owning the volumes is prohibitive and requires personnel and space that is not available. He subscribes to a computer information retrieval service which connects the law office with a master library computer data base by telephone modem.

Using the office terminal keyboard, specific library information is reguested; it is displayed in text form on the terminal video screen. The attorney is charged for the use of the data library at a per minute rate.

In the prior art, to preserve the information received, notes were manually made from the terminal viewing screen, or by a screen printer using thermal paper which is both difficult to read and not easily stored. With the apparatus of the invention, the identical information viewed on the screen can be electronically recorded in real time on inexpensive tape cassettes and replayed in real time, as the information was received through the computer terminal anytime after the phone connection with the host computer has been disconnected.

Thus, the apparatus of the invention allows the lawyer to "view", by recording, more information at a much faster rate than he can read from the screen. The cost of expensive computer access time is reduced, and the recorded data may be replayed, stopping it as often as required. A tape may be filed for future use to create a personal "library data base" adapted from prior searches undertaken from the master computer data base.

EXAMPLE II

A home handyperson has a home computer and telephone connection which accesses a computer information network. After starting to repair a leaky kitchen faucet, the handyperson is unable to remember how the faucet goes back together again. The person recalls a magazine article which had all the information needed to reassemble the faucet. The person accesses the computer data base and asks for the index. After finding the article about faucets, its display on the home terminal computer screen is requested. While the text of the entire article is "scrolled" on the screen, it is simultaneously recorded on cassette tape using the apparatus of the invention. After the data base is disconnected, the handyperson "replays" the article in short segments, starting and stopping the tape recorder as often as is desired essentially in a time period of that person's discretion. Charges incident to a "study" of the text while connected to the master computer information data base are avoided.

EXAMPLE III

In the past, deaf and hearing impaired people have used elaborate teletype and telex equipment to communicate by wire over long distances. These are expensive, bulky, and hard to maintain in good working order.

With computers and terminals interconnected by phone modems and the apparatus of the invention, communications between such hearing impaired people would be as follows "A" would telephone "B". "B" would have a computer telephone modem on "automatic answer" (since the phone ring would not be heard). "B's" computer would answer and connect "B's" computer with "A's" on the phone line. "A" would type a message which will also appear on "B's" computer screen. If the message is longer than the space on the screen, it will scroll down showing only the last lines typed. The apparatus of the invention may be set to automatically record the message on a storage medium. When "B" sees that a phone message has been received the stored message maybe replayed. For long distance, as well as long messages, correspondence can be sent, and stored, at night when rates are lowest.

EXAMPLE IV

A sports "enthusiast" who has a personal computer or terminal and tape recorder cannot start the day or evening without knowing the latest scores. The computer is programmed to phone "a sports news computer service" every evening during sleeping hours. The scores are automatically recorded. In the morning, the stored sports information is instantly replayed.

EXAMPLE V

The "playback" means of the apparatus is itself useful as an archival access system suitable as a replacement for card catalogs, microfilm and microfiche. Using the system with magnetic cassette tape would lend such an archival system to widespread application. For example, a library could index its collection and record the index on magnetic cassette tape. A playback apparatus in accord with the invention would include a cassette playback machine and video screen. Equipped with a forward, stop, rewind and a "fast" speed, information on the tape cassette would be viewed on the video screen in much the same manner as a microfilm. Optical and other mechanical problems incident to film handling would be avoided. As is evident, the invention is also suitable as a means for text publication.

The foregoing are illustrative of typical uses to which the apparatus of the invention may be applied. It is evident that the ability to store information and create archival files of information accessed will result in great time saving, and great convenience to the user as well as reduced charges for access time to master computer data banks. Variations of the invention will be evident to those of skill in the art.

What is claimed is:

1. Apparatus for recording at a remote location the data contained in a signal transmitted from a host computer, in which said signal consists of a succession of discrete serial binary digital signals each of which comprise a character byte, each byte including a predetermined number of control bits associated with a data character, each data character having a uniform predetermined number of bits, said apparatus including:
   (A) communication means for accepting at the remote location the signal generated by the host computer;
   (B) means for processing said signal including
      (i) first means for receiving a serial input corresponding to the succession of discrete character bytes of said signal and converting said serial input into a parallel data signal, said first means including register means interconnected with a buffer means for providing a pulse at the beginning of each character byte within said signal to set the buffer means to store a number of bits corresponding to the uniform number of bits associated with each data character; and transmitter means for providing a parallel data signal of data character bits stored in said buffer means, from said buffer means when a number of bits corresponding to the predetermined number of bits in a data character of the said byte are stored in said buffer means; and
      (ii) second means for receiving the parallel data signal corresponding to a data character from said buffer means of the first means and translating said parallel data signal into a translated serial data signal which comprises the predetermined number of bits of each of the data characters associated with the serial succession of bytes in the signal accepted by the communication means; and
   (C) means for storing said translated serial data signal generated by the second means.

2. The apparatus of claim 1 including further means interconnected between the second means of the signal processing means and the means for storing, for converting said sequence of data character bits of the serial data signal generated by the second means into a recordable sine wave.

3. The apparatus of claim 2 in which the further means is a "bit-boffer".

4. The apparatus of claim 2 or claim 3 in which the means for storing is a magnetic tape.

5. The apparatus of claim 1 in which the signal processing means is a universal asynchronous receiver transmitter.

6. The apparatus of claim 1 or claim 2 in which the means for storing is a disc means.

7. The apparatus of claim 1 or claim 2 in which the means for storing is an in-line random access memory.

8. Playback apparatus for displaying a stored data signal present in a means for storing, in which a storage media stores a succession of binary digital signals corresponding to data characters in which, each data character has a uniform predetermined number of serial bits and the bits forming the characters are stored in a sequential string fashion, including:
   (A) means for generating a signal corresponding to the stored sequential string of data characters from the storage media;
   (B) signal processing means for processing the signal derived from said storage media including
      (i) first means for receiving a serial input signal of a sequential string of data characters and converting said serial input signal into a parallel data signal, said first means including register means interconnected with a buffer means for providing a pulse at the beginning of each character to set the buffer means to store a number of bits from said serial input signal corresponding to the uniform number of bits associated with each data character of the signal; and transmitter means for providing a parallel data signal corresponding to the character bits stored in said buffer means from said buffer means when a number of bits corresponding to the predetermined number of bits in a data character are stored; and
      (ii) second means for receiving the parallel data signal corresponding to the character bits stored in the buffer of the first means and for translating said parallel data signal into a translated serial data signal in which a predetermined number of serial control bits are associated in the translated signal with each data character of the parallel signal in a correspondence with a pulse transmitted by a register means corresponding to a predetermined number of bits; and
   (C) means for converting said translated serial data signal into a visual display of said data characters.

9. The apparatus of claim 8 in which the signal processing means is a universal asynchronous receiver transmitter.

10. The apparatus of claim 5 or claim 9 in which the means for storing is a magnetic tape.

11. The apparatus of claim 5 or claim 9 in which the means for storing is a disc means.

12. The apparatus of claim 5 or claim 9 in which the means of storing is an in-line random access memory.

13. The data retrieval system in accord with claim 10 further including a tape recorder having a forward, stop, and rewind control with respect to a playback mode in which a signal is generated from a tape storage media.

14. In a terminal system in which a serial data signal comprising a succession of bytes from a host computer is accessed by a terminal at a location which is remote from the host computer, a data storage and retrieval system in the terminal in which
   (I) the data storage means includes:
      (A) signal processing means for processing said accessed serial data signal including
         (i) first means for receiving a serial input signal from the host computer and converting said serial signal into a parallel data signal, said first means including register means interconnected with a buffer means for providing a pulse at an interval in the sequence of bits in the serial data signal at the beginning of each data character to set the buffer means to store a predetermined number of bits corresponding to the uniform number of bits associated with each data character; and transmitter means for providing a parallel data signal of bits from said buffer means when a number of bits corresponding to the predetermined number of bits in a data character are stored in said buffer; and (ii) second means for receiving the parallel data signal from said buffer of the first means and translating said parallel data signal into a translated serial data signal which comprises a succession of only the bits of the data characters associated with the received signal; and (B) means for storing said translated serial data signal as a succession of uniform length data characters in a sequence corresponding to the succession of data bytes transmitted from the host computer; and in which (II) the data retrieval system includes:

(A) playback means for generating a playback signal from the means for storing said translated signal;

(B) signal processing means for processing the signal derived from said means for storing of the data storage means including:

(i) first means for receiving a serial input signal of a sequential string of data bits and converting said serial input signal into a parallel data signal, said first means including register means interconnected to a buffer means for providing a pulse at the beginning of a predetermined interval of serial bits to set the buffer means to store a number of bits corresponding to a uniform number of bits associated with a predetermined data character and transmitter means for providing a parallel data signal from said buffer means when a number of bits corresponding to the predetermined number of bits in a data character are stored; and (ii) second means for receiving the parallel data signal from said buffer of the first means and translating said parallel data signal into a playback serial data signal in which control bits are associated with each data character in a correspondence with a pulse transmitted by a register means according to the predetermined number of bits associated with a byte for each data character; and (C) means for converting said playback serial data signal to a visual display of data characters.

15. The system of claim 14 in which the means for storing is an audio cassette tape which has a signal thereon recorded by a tape recorder; the means for playback is an audio cassette tape recorder operated in a playback mode; and the means for providing a visual display includes a cathode ray tube.

* * * * *